May 7, 1940.   J. M. GERRARD   2,199,744
BAND CUTTER AND TENSIONING DEVICE
Filed Dec. 11, 1939   3 Sheets-Sheet 1
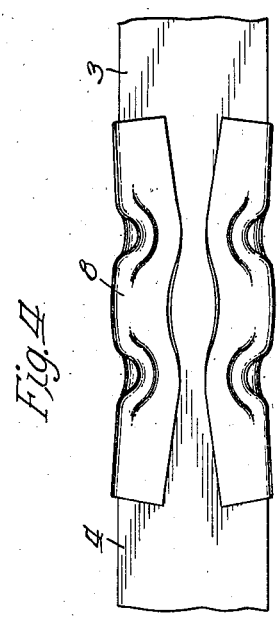
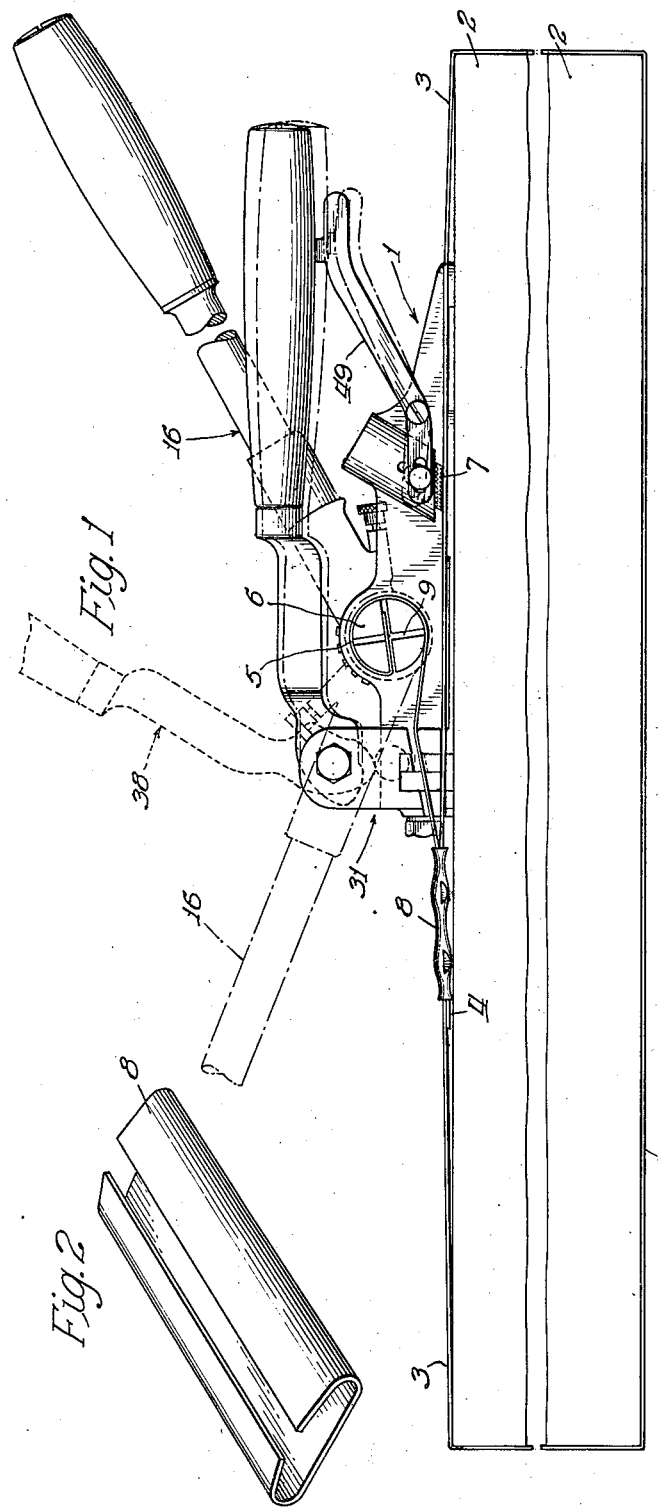
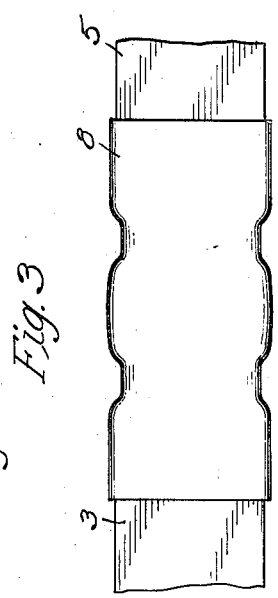
Inventor:
John M. Gerrard
By: Stice & Stice
Attorneys.

May 7, 1940.  J. M. GERRARD  2,199,744
BAND CUTTER AND TENSIONING DEVICE
Filed Dec. 11, 1939  3 Sheets-Sheet 2

Inventor:
John M. Gerrard
By: Hill & Hill
Attorneys.

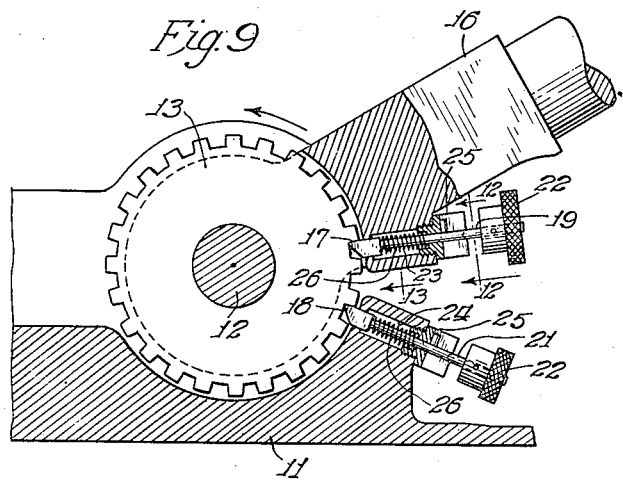
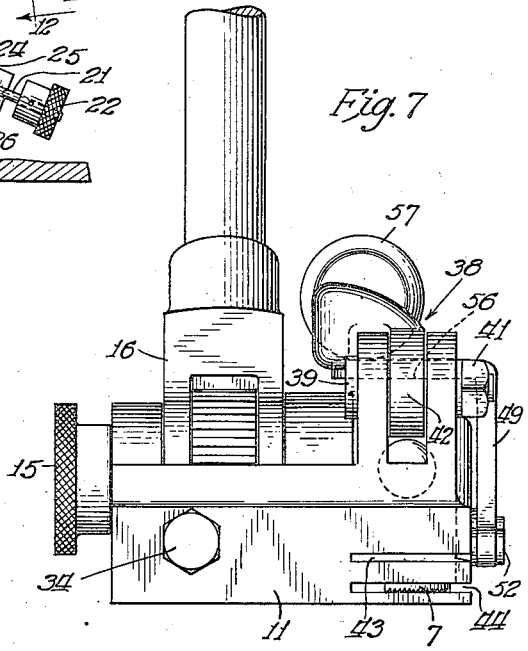
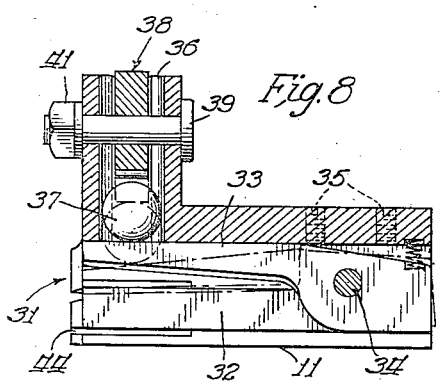
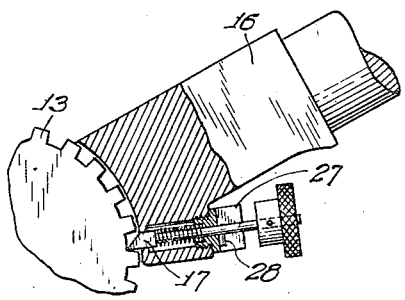
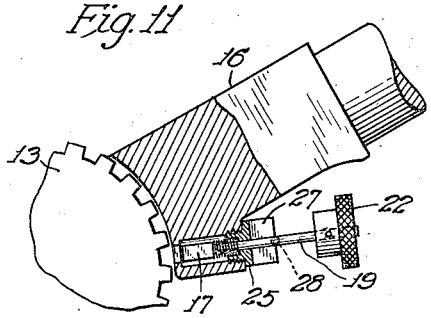
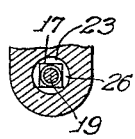

Patented May 7, 1940

2,199,744

UNITED STATES PATENT OFFICE 2,199,744

BAND CUTTER AND TENSIONING DEVICE

John M. Gerrard, Chicago, Ill.

Application December 11, 1939, Serial No. 308,733

10 Claims. (Cl. 140—93)

The invention relates generally to tightening devices, and more particularly to devices for use in tightening metal bands or like members about bales or other packages.

The invention has among its objects the production of such a device with which is combined a suitable cutter for severing the excess portion of the band to provide a device which is very efficient.

Another object of the invention is the production of a tightening device in which the cutting mechanism is so arranged that the tightened band is automatically released from the machine when the excess portion has been severed, the release mechanism being operated by the cutter handle so that the severing and releasing of the band are accomplished in substantially a single operation.

A further object of the invention is the production of such a device which is so constructed that the tightening drum may be forcibly rotated in either direction.

Another object of the invention is the production of a band cutter having novel features as will hereinafter be described.

Many other objects and advantages of the construction herein shown and described will be obvious to those skilled in the art from the disclosure herein given.

To this end, my invention consists in the novel construction, arrangement, and combination of parts herein shown and described and more particularly pointed out in the claims.

In the drawings wherein like reference characters indicate like or corresponding parts:

Fig. 1 is a side elevational view of a device embodying features of the present invention, illustrating the manner in which the device is used;

Fig. 2 is a perspective view of one of the metal clips used for securing the ends of the bands together;

Fig. 3 is a top plan view of one of the clips illustrated in Fig. 2 secured in place on the band;

Fig. 4 is a bottom plan view of the clip shown in Fig. 3;

Fig. 7 is a front end view of the machine shown in Figs. 5 and 6;

Fig. 8 is a sectional view taken substantially on the line 8—8 of Fig. 6;

Fig. 9 is an elevational sectional view of a portion of the machine taken substantially on the line 9—9 of Fig. 6;

Fig. 10 is an elevational sectional view through a portion of the operating handle or lever of the device, showing the pawl on the handle in reversed position;

Fig. 11 is a sectional view similar to Fig. 10 showing the pawl in inoperative position;

Fig. 12 is a sectional view taken substantially on the line 12—12 of Fig. 9; and Fig. 13 is a sectional view taken approximately on the line 13—13 of Fig. 9.

Figure 5:
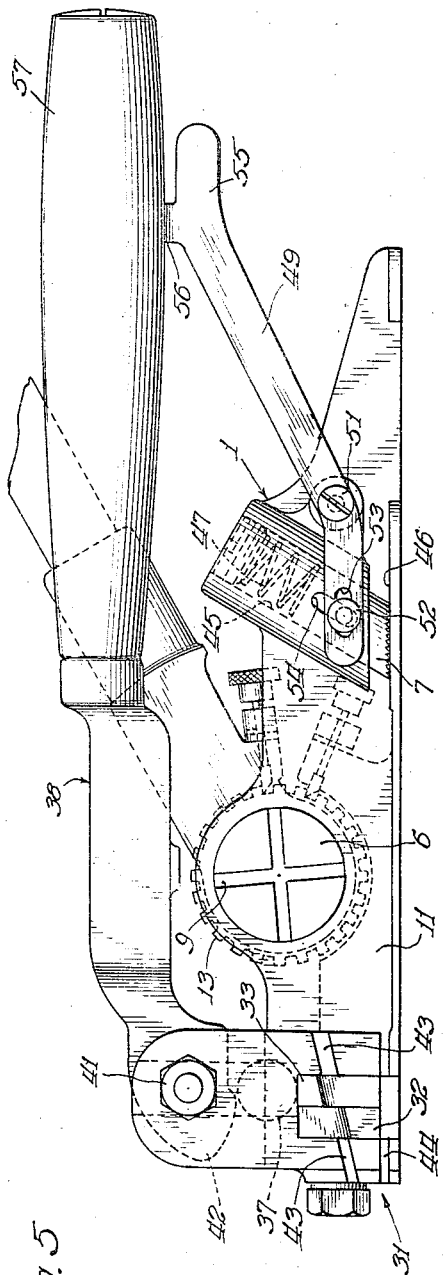
Fig. 5 is an enlarged side elevational view of the machine shown in Fig. 1.

It has been customary in securing bands to bales or other packages to employ a tightening device for tensioning the band around the package, after which the ends of the band were securely fastened together by various means, the tensioning apparatus being then disengaged from the band, after which the excess portion thereof was severed by means of the usual hand shears or snips.

As shown in Fig. 1, the device illustrated designated generally by the numeral 1, is placed upon the box or other package 2, upon which the band 3 is to be placed, one end 4 of the band passing through the machine; the opposite end 5 encircling the package and secured to the drum 6 as will hereinafter be described. The end 5 of the band is wound upon the drum 6 while the opposite end 4 is held stationary in the machine by means of a dog 7, thereby tensioning the band around the package. When enough of the band has been wound upon the drum 6 to give the desired tension, a seal 8 similar to that illustrated in Fig. 2 is placed upon the band and crimped as shown in Figs. 3 and 4 to securely lock it and the ends of the band together, this being accomplished by a suitable device of which there are many on the market. The above described operation is similar to that of machines now on the market.

Figure 6:
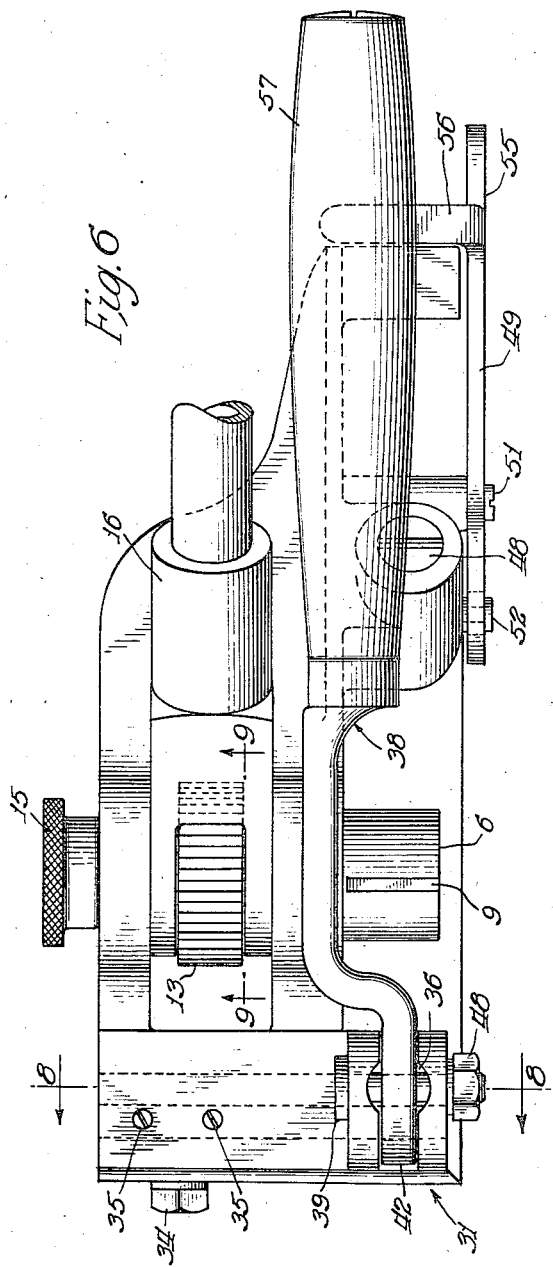
Fig. 6 is a top plan view of the machine illustrated in Fig. 5.

As shown in Figs. 5 through 7, the device comprises a base 11 having a shaft 12 journaled therein. Mounted on the shaft is a toothed driving wheel 13, one end of the shaft terminating in the drum 6 and the opposite end in a knurled knob 15. An operating arm or handle 16 is also pivotally carried on the shaft 12. A pawl 17 carried by the handle 16 operatively connects the latter with the toothed wheel 13 and a similar pawl 18 carried by the base 11 also engages the toothed wheel 13. Thus, when the handle 16 is pivoted in a counter-clockwise direction about the shaft 12, the pawl 17 will engage the toothed wheel 13 and rotate it in the same direction. The pawl 18, as shown in Fig. 9, will allow the toothed wheel 13 to rotate in a counter-clockwise direction, but will prevent the same from rotating in a clockwise direction. The pawls 17 and 18 are rectangular in cross section and are carried by rods 19 and 21 respectively, the ends of the latter being provided with knurled caps 22. The pawls 17 and 18 extend through rectangular openings in the handle 16 and base 11 to engage the toothed wheel 13. The rods 19 and 21 extend through cylindrical chambers 23 and 24 in the handle and base, respectively, of a size to receive the pawls 17 and 18 and pass through sleeves 25 which are threaded into the handle and housing. Springs 26 positioned in the chambers 23 and 24 encircle the rods 19 and 21, respectively. These springs engage the pawls 17 and 18, respectively, and the sleeve 25, thereby urging the pawls into engagement with the toothed wheel 13.

As shown in Fig. 11, the chamber 23 is of a size to permit the pawl to be drawn therein by pulling the cap 22 away from the sleeve 25, and is of a diameter to permit rotation of the pawl therein. Thus, by pulling the cap 22 located on the handle 16 outward, the pawl 17 may be drawn into the chamber 23, where it may be rotated 180°, if desired. The pawl 18 and chamber 24 are similarly constructed to permit reversing of the pawl. When the pawls 17 and 18 are in a position reversed to that shown in Fig. 9, the handle 16 will rotate the toothed wheel 13 oppositely to that illustrated in Fig. 9 or in a clockwise direction. Thus, it will be seen that the action of the handle 16 upon the toothed wheel 13 may be reversed merely by pulling the caps 22 away from their respective sleeve 25 and giving the same a half turn. To facilitate easy and rapid reversing of the pawls 17 and 18, each sleeve 25 is provided with a slot 27 in which is positioned a pin 28 extending transversely to and rigidly carried by the rods 19 and 21. To reverse the pawls, the cap 22 is pulled away from the sleeve 25 until the pin 28 is withdrawn from the slot 27 after which the pawl assembly may be rotated 180° and returned to its inward position, the pin 28 then being positioned at the opposite side of the slot 27. If the member 22, after being pulled outwardly, is given only a quarter turn, it will engage one of the notches 30 at the extreme outer end of the sleeve 25 and will be prevented by the same from moving inwardly, thereby completely disengaging the toothed wheel 13 and the handle 16 or the base 1 as the case may be. Thus, it will be noted that the toothed wheel 13 may be forcibly rotated in either direction merely by reversing the pawls.

Positioned between the drum 5 and the seal 8 securing the two ends of the band together is a cutting mechanism designated generally by the numeral 31. The latter broadly consists of a pair of shearing plates 32 and 33 pivotally carried by the pin or bolt 34. A pair of lock screws 35 positioned on opposite sides of the pin 34 and engageable with the lower cutter 32 securely holds the lower cutter in proper position and provides a means of adjusting the same. The base member is provided with a bore 36 in which is positioned a ball or sphere 37, the latter resting upon the upper cutter 33. A handle designated generally by the numeral 38 is pivotally secured to the base by the bolt 39 and nut 41. As shown in Figs. 1 and 5, the extreme end of the handle 38 is shaped in the form of a cam 42 and is engageable with the sphere 37 so that rotation of the handle 38 upwardly will force the ball 37 and the upper cutter 33 downward, thereby shearing the band passing between the cutting plates 32 and 33. The base is provided with a suitable slot 43 aligned with the cutting plates so that the end of the band will pass through the slot between the cutting plates and onto the drum 6, and a second slot 44 through which the opposite end of the band extends, as shown in Fig. 1. When the handle 38 is moved to the position shown in dotted lines in Fig. 1, the cutting plates 32 and 33 will shear the band in two, thereby severing the excess portion of the band. The dog 7 is slidably carried in a bore 45 and is urged downwardly into engagement with the flange 46 of the base by a spring 47, the latter seating at one end upon the upper end of the dog and at the opposite end upon a suitable member 48 which is threaded into the bore 45. By screwing the member 48 into the bore 45, the spring 47 may be placed under greater compression, thereby providing a means of adjusting the pressure between the dog 7 and the flange 46 of the base member 11. A lever 49 is pivotally carried intermediate its ends by the base by means of a screw 51, one end of the lever 49 being connected to the dog 7 by means of a stud 52 passing through the slot 53 of the lever and the slot 54 in the housing and into the dog 7. Thus, the dog 7 may be readily disengaged from the flange 46 merely by pressing the free end 55 of the lever 49 downwardly, as shown in dotted lines in Fig. 1. The end 55 of the lever is provided with a transversely extending portion 56 which is positioned below and engageable with the grip 57 of the handle 38 so that the dog may be released by pressing the handle 38 downwardly.

The complete operation of the device is as follows:

The device is positioned on the box or container, as shown in Fig. 1, and the end 4 of the band 3 inserted into the machine, the band passing between the dog 7 and the flange 46 through the slot 44, the extreme end extending from the device, as shown in Fig. 1. To insert the band between the dog 7 and the flange 45, the handle 38 is pushed downwardly, thus actuating the lever 38 and raising the dog. The free end of the band is then drawn around the container, a seal 8 threaded on the band and the free end extending through the slot 43 between the cutting plates 32 and 33 and around the drum 6, as shown in Fig. 1. The extreme end of the band is inserted in one of the slots 9 in the drum. The pawls 17 and 18 are positioned, as shown in Fig. 9, and the handle 16 is rotated about the shaft 12 in counter-clockwise direction to the final position indicated by dotted lines in Fig. 1, the pawl 18 preventing the toothed wheel 13 from rotating backwards in a clockwise direction. The handle 16 may be then returned to its original position, the pawl 17 slipping over the teeth on the wheel 13 and the drum 6 again rotated as just described. This is continued until the band has been placed under the desired tension, after which the seal 8 is moved to the approximate position shown in Fig. 1 and a suitable crimping machine applied to the same, crimping the seal, as shown in Figs. 3 and 4, thereby securely fastening the ends of the band to one another. The handle 38 of the cutter is then moved upwardly to the position shown in dotted lines in Fig. 1, thereby forcing the cutter plate 33 downwardly, and cutting off the excess portion of the band wound upon the drum 6. The handle 38 of the cutter is then returned to its original position and continued to be moved downwardly to actuate the lever 49 and raise the dog 7 to allow the device to be withdrawn from the band. In tensioning the same, should the drum 6 be rotated too far, or for some other reason it is desired to forcibly rotate the drum in a clockwise direction, the pawls 17 and 18 are merely reversed as previously described so that the handle 16 will rotate the drum in the opposite direction. This could also be utilized in unwinding the band from the drum 6 to remove the waste portion of the band from the device.

It will be noted from the above description that I have provided a tensioning device which is provided with its own cutter, for severing the band, in which the cutter lever is utilized also to disengage the device from the band so that severing the band and removal of the device is accomplished in substantially a single operation. The cutter is so positioned that substantially all excess material is severed thereby insuring neat and accurate work. It will also be noted that I have provided novel means for forcibly rotating the drum in both a clockwise and counter-clockwise direction, or, if desired, the operating handle may be completely disengaged from the drum.

Having thus described my invention, it will be obvious that various immaterial modifications may be made in the same without departing from the spirit of my invention; hence, I do not wish to be understood as limiting myself to the exact form, construction, arrangement, and combination of parts herein shown and described or uses mentioned.

What I claim as new and desire to secure by Letters Patent is:

1. In a band tensioning device, the combination of a base member, a drum pivotally carried by said base, means for rotating said drum, the latter engageable with one end of a band, a dog positioned at one side of said drum for releasably holding the opposite end of said band, and a cutter positioned on the opposite side of said drum, positioned to sever a portion of said band, and common means for operating said cutter and said dog.

2. In a band tensioning device, the combination of a base member, a drum pivotally carried by said base member, means for rotating said drum, the latter engageable with one end of the band, a dog carried by said base member for releasably holding the opposite end of the band, a cutter supported by said base member and a handle operatively related to said cutter for actuating the same, said handle also operatively related to said dog to release the same from said band.

3. In a band tensioning device, the combination of a base member, a drum pivotally carried by said base member, means for rotating said drum, the latter engageable with one end of the band, a dog carried by said base member for releasably holding the opposite end of the band, a pair of cooperating cutting blades pivotally supported by said base member and a handle movable in one direction to actuate said cutting blades and movable in the opposite direction to release said dog from said band.

4. In a band tensioning device, the combination of a base member, a drum pivotally carried by said base member, means for rotating said drum, the latter engageable with one end of the band, a dog carried by said base member for releasably holding the opposite end of the band, a relatively fixed blade and a cooperating movable blade supported by said base member, a handle pivotally carried by said base member operatively engageable with said movable blade, and an arm pivotally carried by said base member, one end of said arm engageable with said dog and the other end with said handle.

5. In a band cutter, the combination of a base member, a relatively fixed cutting blade mounted thereon, a movable cutting blade pivotally carried by said base, said base having a bore therein above said movable blade, an actuating member positioned in said bore engaging said movable blade, a handle pivotally mounted on said base at a point adjacent to but spaced from one end of said handle, the adjacent end of said handle terminating in a cam-like portion engageable with said actuating member cooperable therewith to bring said movable blade into engagement with the other blade and provide a shearing action therebetween.

6. A band tensioning device, the combination of a base member, a drum pivotally carried by said base member, a toothed wheel operatively connected to said drum, a lever pivotally related to said wheel, a pawl carried by said lever and engageable with said wheel to rotate said drum when said lever is moved, a corresponding pawl carried by said base member, springs urging the respective pawls into engagement with said wheel, said pawls operative to allow rotation of said wheel in one direction, and means for selectively individually reversing said pawls to allow rotation of the wheel in the opposite direction.

7. In a band tensioning device, the combination of a base member, a drum pivotally carried by said base, a toothed wheel operatively connected to said drum, a lever pivotally related to said wheel, pawls carried by said lever and base member, respectively, engageable with said wheel, said lever and base member having a chamber adjacent the respective pawls, the latter being rotatable therein, springs urging said pawls into engagement with said wheel, and means extending from said chambers for withdrawing said pawls therein, and rotating the same.

8. In a band tensioning device, the combination of a base member, a drum pivotally carried by said base, a toothed wheel operatively connected to said drum, a lever pivotally related to said wheel, said base member and lever each having a bore therein terminating in a rectangular opening adjacent said wheel, a rectangular pawl positioned in the opening of each bore, compression springs in each bore urging said pawls into engagement with said wheel, sleeves threaded into and closing the mouths of said bores, a rod secured to each pawl extending from the respective bores through said sleeves, and cooperative means on said sleeves and rods for limiting undesired rotation of said rods and pawls.

9. In a band tensioning device, the combination of a base member, a drum pivotally carried by said base, a toothed wheel operatively connected to said drum, a lever pivotally related to said wheel, said lever and base each having a rectangular bore therein, pawls of similar shape carried by said lever and base member, respectively, engageable with said wheel, said lever and base member having a chamber communicating with the respective pawls, said pawls being rotatable in said chamber but not in said bores, springs urging said pawls into engagement with said wheel, and means extending from said chambers for withdrawing said pawls and rotating the same therein.

10. A band tensioning device, the combination of a base member, a drum pivotally carried by said base member, a toothed wheel operatively connected to said drum, a lever pivotally related to said wheel, said lever and bore member each having a bore therein, a pawl positioned in the bore in said lever and engageable with said wheel to rotate said drum when said lever is moved, a corresponding pawl positioned in the bore in said base member, springs urging the respective pawls into engagement with said wheel, said pawls each having a beveled end engageable with said wheel operative to allow rotation of the latter in one direction, and means for selectively individually reversing said pawls in said bores to allow rotation of the wheel in the opposite direction.

JOHN M. GERRARD.